Aug. 18, 1953
E. P. COX
2,649,174
CLUTCH AND BRAKE DEVICE
Filed May 13, 1949
3 Sheets-Sheet 1
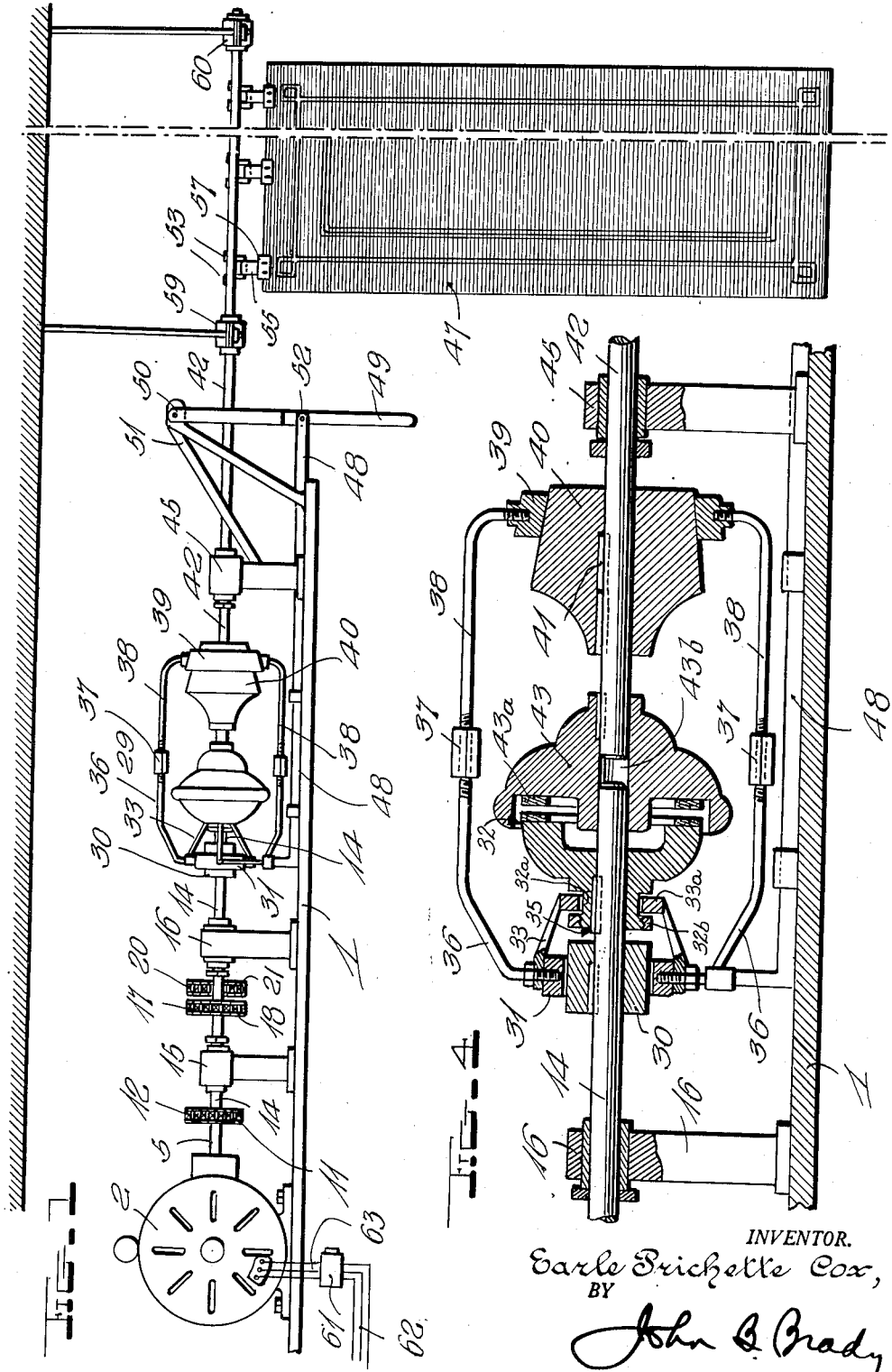
INVENTOR.
Earle Prichette Cox,
BY
John B. Brady
ATTORNEY Aug. 18, 1953  E. P. COX  2,649,174
CLUTCH AND BRAKE DEVICE
Filed May 13, 1949  3 Sheets-Sheet 2
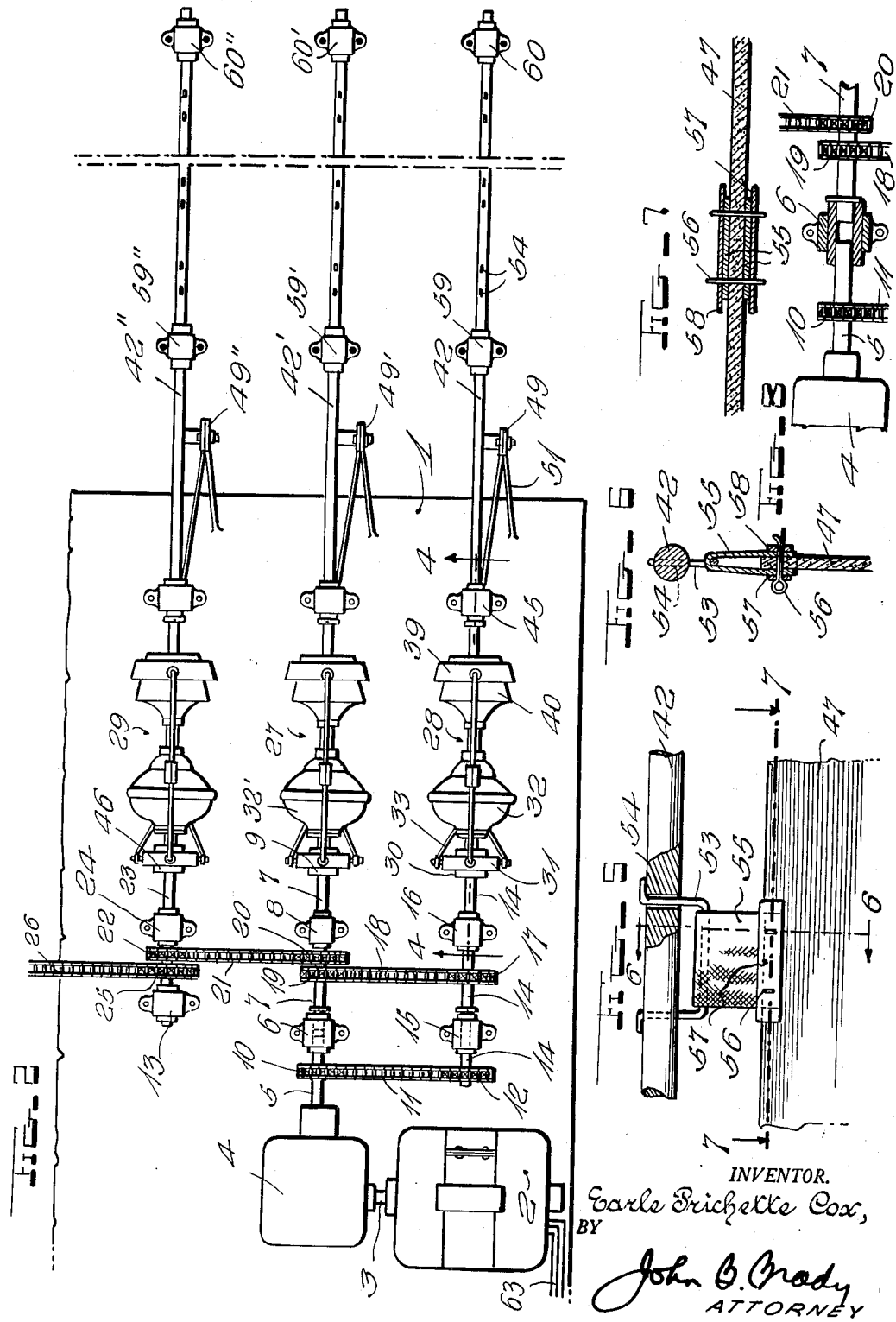
INVENTOR.
Earle Prichette Cox,
BY
John B. Brady
ATTORNEY

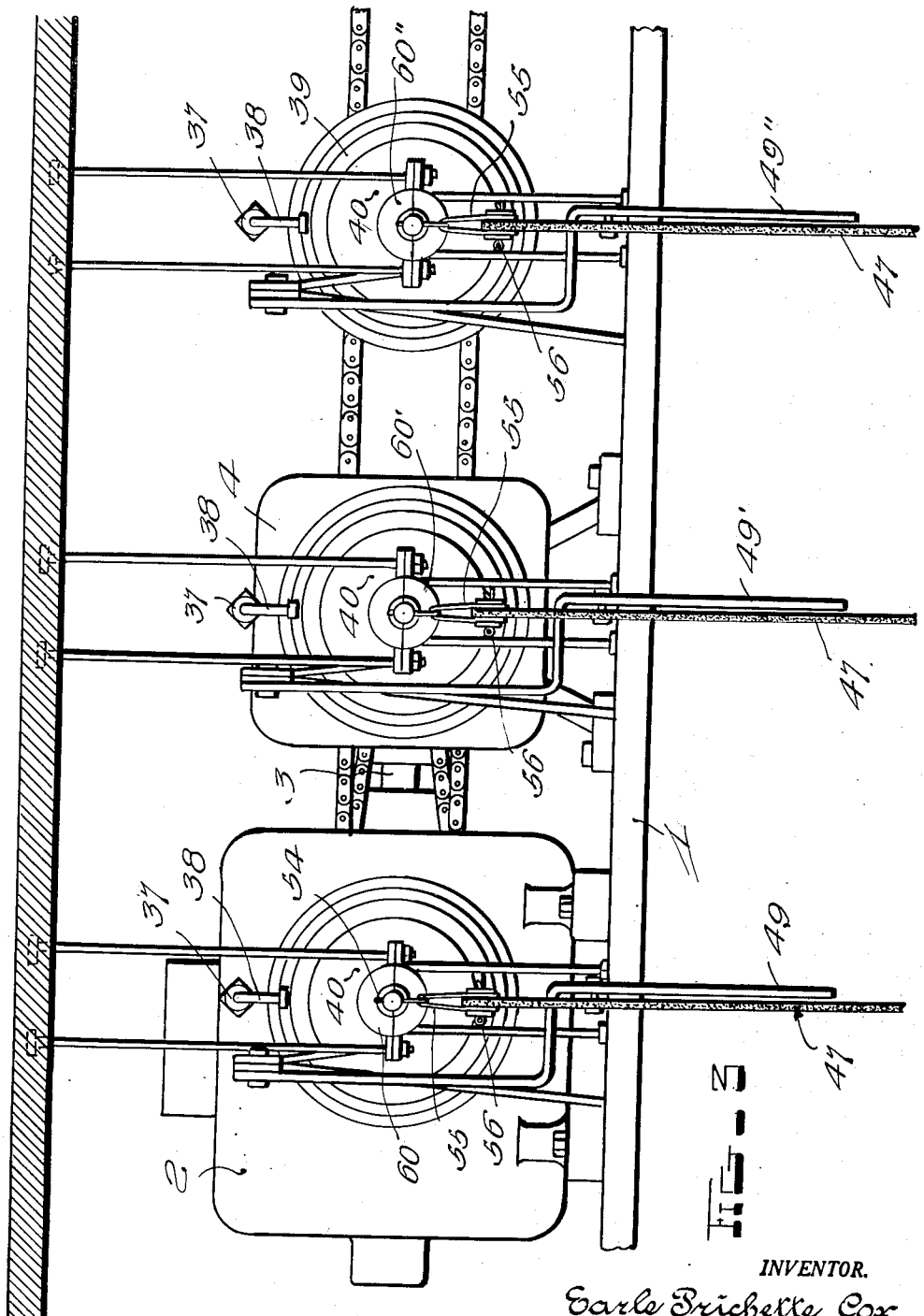

Patented Aug. 18, 1953

2,649,174

UNITED STATES PATENT OFFICE 2,649,174

CLUTCH AND BRAKE DEVICE

Earle Prichette Cox, Columbus, Miss.; Lucile Mc-
Creight Cox, administratrix of said Earle
Prichette Cox, deceased Application May 13, 1949, Serial No. 93,097

3 Claims. (Cl. 192—18)

1

My invention relates broadly to display machines for rugs, and more particularly to equipment for stores for mounting and selectively displaying rugs to prospective customers.

One of the objects of my invention is to provide a construction of display equipment for rugs which may be readily installed in salesrooms, department stores, retail stores, and wholesale houses for conveniently and selectively displaying rugs to prospective customers and buyers.

Another object of my invention is to provide a compact construction of rug display equipment in which a multiplicity of rugs of differing designs are mounted on carriers which may be selectively operated to unroll or roll up large and cumbersome rugs for display purposes.

A still further object of my invention is to provide an arrangement of motor operated rug display system for the selective display of one or more rugs of a multiplicity of rugs, the mechanism including clutch and brake control means for governing the unrolling and rolling up of the selected rug being exhibited.

Still another object of my invention is to provide an arrangement of selective control mechanism for a multiplicity of horizontally extending shafts installed adjacent the ceiling of a salesroom, department store, retail store or wholesale house, by which large and cumbersome rugs may be selectively displayed and unrolled or rolled up to selected positions for exhibiting the pattern of the rug.

Still another object of my invention is to provide a combined clutch and brake mechanism particularly adapted for rug display machines in controlling from a reversible motor system the selective suspension of rugs for display purposes.

Other and further objects of my invention reside in a motor operated variable display system for rugs, as set forth more fully in the specification hereinafter following by reference to the accompanying drawings, in which:

Figure 1 schematically illustrates the display system for rugs constructed in accordance with my invention, and showing in side elevation the mounting of the control mechanism adjacent the ceiling of a display room for variably controlling the unrolling and rolling up of rugs on horizontally extending shaft arrangements; Fig. 2 is a plan view showing the relation of a multiplicity of shaft systems for displaying rugs, and particularly illustrating the selective mechanism for operating the shaft systems selectively for permitting the comparison of rugs carried by the different shaft systems; Fig. 3 is an end view of the multiple shaft arrangement showing the suspension means for three rugs and the mechanism for driving the shaft systems; Fig. 4 is an enlarged longitudinal sectional view taken substantially on line 4—4 of Fig. 2 and illustrating the composite clutch and brake mechanism associated with each of the rug display shaft systems shown in Figs. 1-3; Fig. 5 is a fragmentary view of one of the rug display shafts, and illustrating the manner of suspending a rug from the shaft; Fig. 6 is a vertical sectional view taken substantially on line 6—6 of Fig. 5; Fig. 7 is a horizontal sectional view taken substantially on line 7—7 of Fig. 5; and Fig. 8 is a fragmentary enlarged sectional view showing the manner of journalling the main driving shaft with respect to one of the countershafts employed in the rug display system of my invention.

My invention is directed to a compact equipment which may be readily installed by rug dealers for facilitating the handling and displaying of rugs and promoting the sale thereof. The system of my invention provides a multiplicity of rotatively journalled shafts mounted close to the ceiling of a salesroom and above the floor for a distance in height equal to the length of the rugs. The several shafts are selectively controlled so that they may be rotated at will to roll up or unroll the rugs carried thereby, to enable prospective customers to view and compare the rugs. In order to initially mount the rugs on the several shafts I utilize a special form of conveyer for lifting cumbersome rugs and facilitating the attachment thereof to the multiple shafts. I provide a driving motor and an associated speed reduction gear system delivering rotative power to a multiplicity of parallel extending countershafts in series. Each of the countershafts drives independent clutch and brake mechanisms which connect with the shaft systems on which the individual rugs are mounted. These shaft systems may extend adjacent the ceiling for a considerable length of the display room, and may carry a number of rugs spaced along the length thereof; the shafts being suitably journalled in bearings for properly supporting the load. Any one of the shafts may be selectively initiated into rotative movement to unroll or roll up the rugs for enabling comparison to be made of the rugs carried by the different shafts. The clutch and brake mechanism ensures selective movement of the rugs to the desired position for displaying the patterns thereof. The reverse movement of the driving motor ensures the restoration of the rugs to the initial rolled and stored positions thereof, ready for the next succeeding display selectively at the will of the operator.

Referring to the drawings in detail, reference character 1 designates a supporting structure which is mounted adjacent the ceiling of a display room, department store, retail store or wholesale house for carrying driving reversible electric motor 2, which drives shaft 3 leading to the reduction gear 4. Shaft 5 is driven from reduction gear 4 and is journalled at the end thereof in the double bearing member 6, shown more clearly in Fig. 8. Countershaft 7 is also journalled in the double bearing member 6 and revolves independently of driving shaft 5. Countershaft 7 is journalled in bearing 8 and carries a guide boss 9 thereon, and terminates in disk clutch 32'. Driving shaft 5 carries sprocket wheel 10 thereon, which is engaged by sprocket chain 11 and drives sprocket wheel 12 carried by countershaft 14 journalled in bearings 15 and 16, as illustrated more clearly in Figs. 1, 2 and 4. Countershaft 14 also carries sprocket wheel 17 which is engaged by sprocket chain 18. Sprocket chain 18 engages sprocket wheel 19 carried by countershaft 7. Countershaft 7 also carries a sprocket wheel 20, disposed adjacent sprocket wheel 19, and serves to drive sprocket chain 21. Sprocket chain 21 is engaged over sprocket wheel 22 carried by countershaft 23. Countershaft 23 is journalled in bearings 13 and 24, and carries sprocket wheel 25 thereon. Sprocket chain 26 extends from sprocket wheel 24 and continues to the next adjacent shaft system, not shown, and forms part of the control system for displaying rugs. Thus, it will be seen that countershaft 14 is driven from the main driving shaft 5 and this in turn drives countershaft 7, which in turn drives countershaft 23. Rotative motion imparted to the three countershafts illustrated simultaneously revolves the guide bosses 30, 9 and 46. The mechanism associated with each of the guide bosses driven by countershafts 14, 7 and 23 is identical in each of the shaft systems, and accordingly the several mechanisms will be described by reference to Fig. 4 which is illustrative of the mechanism embodied in association with each of the shaft systems.

Referring to Fig. 4, the guide boss 30 which is keyed rigidly to countershaft 14 has a slip ring 31 longitudinally adjustable thereon. This slip ring 31 is connected to a disk clutch 32 through the control rods 33 so that disk clutch 32 is rotatable with respect to the control rods. The disk clutch 32 has an internal longitudinally extending groove or keyway 35 therein. This keyway is engaged by the key 34 carried by countershaft 14. Thus disk clutch 32 is displaceable longitudinally of countershaft 14 with keyway 35 guided by key 34 on shaft 14. The disk clutch 32 is provided with a cylindrical end portion 32a over which slip ring 33a connected with control rods 33 is rotatably engageable and confined in position by member 32b, screw-threaded onto the cylindrical end portion of the disk clutch 32. The disk clutch 32 is freely rotatable inside slip ring 33a. I provide guide rods 36 extending from slip ring 31 and connected through adjustable sleeve couplings 37 to guide rods 38, which in turn connect with the circular slip band 39. The circular slip band 39 has an inwardly inclined face which is variably engageable by the rotating brake drum 40. The rotating brake drum 40 is provided with a key and keyway connection 41 to shaft 42. Shaft 42 is connected at this extremity with disk clutch 43 and is journalled in the bearing 45.

The disk clutch 43 carries an annular friction face lining 43a which is aligned with the annular friction face lining 32a carried by disk clutch 32. The disk clutch 43 has a centrally disposed bore 43b therein, into which the end of countershaft 14 extends. Countershaft 14 is thus aligned with disk clutch 43 and as the annular friction face lining 32a of disk clutch 32 is displaced to the right, the annular friction faces 32a and 43a establish connection for exerting a driving force from countershaft 14 through shaft 42 through the intermediary of annular friction faces 32a and 43a at the same time that the braking restraint between slip band 39 and rotating brake drum 40 are released. Thus shaft 42 which suspends the rug shown at 47 may be revolved. The displacement of disk clutch 32 for engaging friction faces 32a and 43a and disengaging slip band 39 from brake drum 40 is effected by the control bar 48 which is shifted linearly under control of manual lever 49 fulcrumed at 50 in the frame supports 51 carried by the supporting structure 1. Lever 49 is pivotally connected at 52 with control bar 48 so that linear movement is imparted to control bar 48 upon shifting lever 49. The control bar 48 functioning through guide rods 36 and slip band 39 are relatively fixed and provide the braking torque against which brake drum 40 engages.

The rug shown at 47 is connected to the shaft 42 by means of substantially U-shaped hangers 53, which extend through spaced apertures 54 formed in shaft 42. The minute size of these apertures 54 in the solid shaft 42 do not unnecessarily weaken the structure of the shaft. The rug has the periphery thereof supported by a loop of canvas webbing shown at 55 which is attached by cotter pins 56 to the upper peripheral border of the rug reinforced by the eyelet plates 57 and 58. Several such hangers are provided at spaced intervals between the border of the rug such as shown at 47 and the shaft 42. Shaft 42 is suspended from the ceiling structure in journals represented at 59 and 60 to ensure adequate support for the rug. As heretofore noted, shaft 42 may continue in a longitudinal direction and provide support for a number of rugs which may be stored along different lengths of the shaft so that all of these rugs are unrolled or rolled up simultaneously with the operation of the motor system.

Driving motor 2 is reversible in its characteristics, and I have schematically shown the manner of control of the motor by means of reversing switch 61 leading from power supply line 62 to the motor supply line 63. A one-fourth horsepower single phase reversing motor has been found sufficient in combination with the reduction gear system indicated at 4 to meet the average requirements in rolling and unrolling rugs from the shaft system. This is true even where a number of rugs are mounted edge to edge on an extended shaft. Of course, when the load is substantially increased a motor of larger power must be installed. Reversible switch 61 serves to reverse the direction of movement of the driving motor 2 and control the rolling or unrolling of the rug 47.

As heretofore observed, the clutch and brake control mechanisms by which movement of shaft 42 is regulated are arranged symmetrically in the coacting shaft systems as represented at 27 and 29. For example, shaft 42' is controlled by composite clutch and brake mechanism 27, while shaft 42'' is controlled from composite clutch and brake mechanism 29, for the rolling and unrolling of rugs carried by the respective shafts journalled in hangers 59' and 60' and 59" and 60". Separate levers are provided for separately controlling shafts 42' and 42" as represented at 49' and 49". Thus the continuous rotation of countershafts 14, 7 and 23 may be converted into selective movement of shafts 42 and 42' and 42" for lowering or raising the rugs carried thereby.

The several rugs thus displayed on the different shafts may be readily compared and a selection readily made.

I have found the system of my invention very practical and efficient in use, but I realize that modifications may be made and I intend no limitations upon my invention other than may be imposed by the scope of the appended claims.

What I claim as new and desire to secure by Letters Patent of the United States is as follows:

1. Control mechanism comprising in combination a driving shaft and a driven shaft, means journalling said shafts for rotation on the same horizontal coincidental axis, a brake drum carried by said driven shaft and having a tapered cylindrical surface thereon, a clutch member carried by said driven shaft and having a central socket recess therein aligned with said driving shaft and into which the end of said driving shaft projects, a cylindrical guide boss carried by said driving shaft, a non-rotatable slip ring longitudinally slidable along said guide boss, a clutch member rotatably connected with said slip ring and aligned with the clutch member carried by said driven shaft, a brake band engageable with respect to the tapered cylindrical surface of said brake drum, means interconnecting said brake band with said slip ring, and means connected with said non-rotatable slip ring for axially displacing said second mentioned clutch member into engagement with said first mentioned clutch member while simultaneously releasing said brake band with respect to said brake drum for effecting a driving connection and transmitting rotative power from said driving shaft to said driven shaft.

2. A control mechanism as set forth in claim 1, in which the means interconnecting said slip ring and said brake band comprise a pair of longitudinally extending, spaced, substantially parallel rods extending around said clutch members.

3. Control mechanism as set forth in claim 1, in which the means interconnecting said slip ring and said brake band are adjustable longitudinally for predetermining the time of release of said brake band with respect to said brake drum in coordination with the interconnection of the clutch element associated with said driving shaft and the clutch element carried by said driven shaft.

EARLE PRICHETTE COX.

References Cited in the file of this patent

UNITED STATES PATENTS

| Number | Name | Date |
|---|---|---|
| 1,141,349 | Larrabee | June 1, 1915 |
| 1,525,965 | Thomas | Feb. 10, 1925 |
| 1,701,361 | Elliott | Feb. 5, 1929 |
| 1,720,816 | Best | July 16, 1929 |
| 1,750,582 | Elliott | Mar. 11, 1930 |
| 2,265,597 | Finch | Dec. 9, 1941 |